United States Patent [19]
Ney et al.

[11] Patent Number: 5,919,240
[45] Date of Patent: Jul. 6, 1999

[54] CONTROL DEVICE FOR A SUSPENSION SUCH AS HYDROPNEUMATIC SUSPENSION FOR A MOTOR VEHICLE

[75] Inventors: Yves Ney, Hayange; Alain Tranzer, Chatenay-Malabry, both of France

[73] Assignees: Automobiles Peugeot, Paris; Automobiles Citroën, Neuilly-sur-Seine, both of France

[21] Appl. No.: 08/913,961

[22] PCT Filed: Mar. 27, 1996

[86] PCT No.: PCT/FR96/00453

§ 371 Date: Sep. 25, 1997

§ 102(e) Date: Sep. 25, 1997

[87] PCT Pub. No.: WO96/30224

PCT Pub. Date: Oct. 3, 1996

[30] Foreign Application Priority Data

Mar. 28, 1995 [WO] WIPO ............... PCT/FR95/03597

[51] Int. Cl.⁶ .................................................. G06F 17/00
[52] U.S. Cl. ..................... 701/37; 701/38; 280/5.514; 280/5.515
[58] Field of Search ................ 701/37, 38; 180/9.52, 180/22, 41; 280/5.5, 5.503, 5.508, 5.507, 5.514, 5.515; 340/940

[56] References Cited

U.S. PATENT DOCUMENTS

| | | | |
|---|---|---|---|
| 4,747,615 | 5/1988 | Yamamoto | 701/37 |
| 5,072,392 | 12/1991 | Taniguchi | 701/38 |
| 5,087,072 | 2/1992 | Kawarasaki | 701/38 |
| 5,097,916 | 3/1992 | Brandstadter | 180/9.1 |
| 5,475,593 | 12/1995 | Townend | 280/5.515 |
| 5,701,245 | 12/1997 | Ogawa et al. | 280/5.515 |

FOREIGN PATENT DOCUMENTS

| | | | |
|---|---|---|---|
| 0 255 720 A1 | 8/1987 | European Pat. Off. | B60G 17/00 |
| 2 680 139 A1 | 2/1993 | France | B60G 17/00 |
| 43 23 544 A1 | 1/1994 | Germany | B60G 17/00 |

Primary Examiner—Jacques H. Louis-Jacques
Assistant Examiner—Gertrude Arthur
Attorney, Agent, or Firm—Pollock, Vande Sande & Amernick

[57] ABSTRACT

A control device for a suspension such as a hydropneumatic suspension for a motor vehicle, including three actuators (E1, E2, E3) capable of supplying a liquid to or removing a liquid from three independent suspension lines. The actuators are driven by a computer (18) in accordance with a predetermined principle, which takes into consideration the position of the car body as well as first, second and third derivatives with respect to time of the parameters representative of the position.

15 Claims, 2 Drawing Sheets

CONTROL DEVICE FOR A SUSPENSION SUCH AS HYDROPNEUMATIC SUSPENSION FOR A MOTOR VEHICLE

FIELD OF THE INVENTION

The invention concerns a device for controlling a suspension such as a hydropneumatic suspension, and, more specifically, an active hydropneumatic suspension for automotive vehicles. The invention also concerns a vehicle of any kind equipped with this device.

BACKGROUND OF THE INVENTION

Patent No. FR-A-2625711 describes an active hydropneumatic suspension for automotive vehicles, comprising an hydraulic jack linked to each of the wheels and equipped with a main chamber connected by means of a shock absorber to a main hydropneumatic accumulator, as well as three height regulators, which are linked respectively to each of the front jacks and to the two jacks on the rear axle. Each regulator is connected, first, to a pressurized fluid source by means of a compensating hydropneumatic accumulator and to an outflow tank or reservoir, and, secondly, to the main chamber(s) of the associated jack or jacks.

These height regulators are actuators, such as hydraulic slide valves or solenoid valves, capable of sending fluid into a line incorporating the main chamber of the associated jack, or of removing liquid therefrom so as to correct for height variations of the vehicle body. This arrangement provides a suspension which not only reacts conventionally to normal road irregularities, but can also compensate for vertical spring movement of the suspension components when the latter undergo expansion or compression stress for a long period, with the result that the vehicle preserves stability and position-retention in relation to the average ground contour, in particular during rolling when turning or pitching when accelerating and braking.

Spring movement of the body is corrected by taking into account body height and various parameters representative of the dynamic state of the vehicle. However, this motion is controlled hydromechanically. Correction always occurs at the same rate, and, depending on the case, it may occur too slowly or too rapidly to ensure proper vehicle stability.

SUMMARY OF THE INVENTION

The invention is intended to eliminate this difficulty by proposing a device for controlling an active hydropneumatic suspension equipping an automotive vehicle, this device making it possible to provide for excellent stability of this vehicle, whatever the circumstances or driving style of the operator.

More specifically, the invention concerns a device for controlling a suspension, such as a hydropneumatic suspension, of an automotive vehicle, comprising multiple independent lines, each of which is connected to an actuator capable of feeding liquid into this line or of removing it therefrom, in accordance with a predetermined law of control and as a function of the position of the body and of the temporal variations of the body position, this law taking into account at least the following variables: speed of spring motion of the body, acceleration of the spring motion of the body, and the temporal derivative of this acceleration, this law being represented by the formula:

$$q = A(X - Xo) - BX' + C\gamma + D\gamma'$$

where:

q is the control vector of the actuators

X is the body-position vector

Xo is the vector representing the reference position of the body

X' is the body spring motion-speed vector $\gamma$ is the body spring motion-acceleration vector $\gamma'$ is the vector representing the temporal derivative of this acceleration, and A, B, C, D are matrices whose terms are predetermined constants.

These constants may be calculated at the outset when the system is installed, or they may be modified during use if it appears that modification can improve the correction.

In the present description, the expression "actuator-control vector" designates a vector whose components are parameters characterizing the flow of fluid for each of the respective actuators.

The term "body-position vector" is a vector whose components are parameters representative of the position of the body in space, and the components of the vectors X', $\gamma$, and $\gamma'$ are the first, second, and third time-related derivatives, respectively, of the components of vector X.

In the case of an architecture such as the one described in Patent No. FR-A-2625711 mentioned above, or the architecture to be described below as an example, the matrices A, B, C, D may be diagonal matrices in order to simplify the law of control.

Control of the actuators is effected in terms of pressure, or preferably, flow rate.

The terms of the matrices A, B, C, D are advantageously modified using a truth table, in order to take into account uncertainties regarding the control variables, the expression "control variables" here signifying the components of the vectors X, X', $\gamma$, and $\gamma'$.

In this case, for each degree of freedom, the truth table is calculated so as to prevent counter dynamics, among other things.

The term "truth table" as used in this description signifies a table giving the coefficients used to modify the terms of the matrices A, B, C, D.

The term "counter dynamics" means that a control variable and the derivative thereof are opposite signs. In other words, the variation of this variable tends to become attenuated, thereby giving a kind of "natural" correction. If this phenomenon were not taken into account, the actuator-caused correction could be too great, thus impairing vehicle stability. The use of a truth table improves stability markedly by adjusting optimally the correction to the movements of the body.

According to other characteristics of the device according to the invention:

the position of the body is determined using three parameters which represent three degrees of freedom of the latter;

the three degrees of freedom include: rolling, pitch, and oscillation;

the control variables are either measured, calculated, or estimated.

The word "measured" as used here signifies direct measurement of the quantity in question.

The term "calculated" signifies an indirect calculation of this quantity based on other measurements, without any error that is externally caused.

The term "estimated" signifies an indirect calculation of this quantity, but with a risk of error resulting from causes not taken into consideration.

Preferably, the position of the body and the spring motion thereof are measured or calculated, acceleration of the spring motion of the body is measured or estimated, and the temporal derivative of this acceleration is calculated or estimated.

According to other features of the device according to the invention:

acceleration of spring motion of the body is estimated based on at least one of the following parameters: angle and speed of the steering wheel, speed of the vehicle, pressure in the brake line, position of the accelerator pedal or of the throttle;

the actuators are solenoid valves or servo valves which function proportionally as regards pressure or, preferably, flow rate;

the device comprises sensors giving the position of different points on the body and certain parameters representative of the dynamic state of the vehicle, these sensors being connected to a computer capable of calculating, first, the parameters representative of body position, and second, the flow rate or pressure required in each actuator as a function of these parameters and of the other control variables.

Finally, the aforementioned law may be simplified so as to produce an active correction of at least one of the aforementioned degrees of freedom and a slow correction of the other degree(s) of freedom, for example an active correction of rolling and a slow correction of pitch and oscillation.

The expression "active correction" signifies here a correction taking into account the successive temporal derivatives of a parameter representative of the body position as indicated above, while the expression "slow correction" signifies a correction carried out slowly, given the dynamics of the movements of the body.

BRIEF DESCRIPTION OF THE DRAWINGS

The invention will emerge more clearly from a reading of the following description provided by way of example with reference e to the attached drawings, in which.

DESCRIPTION OF PREFERRED EMBODIMENT

Figure 1:
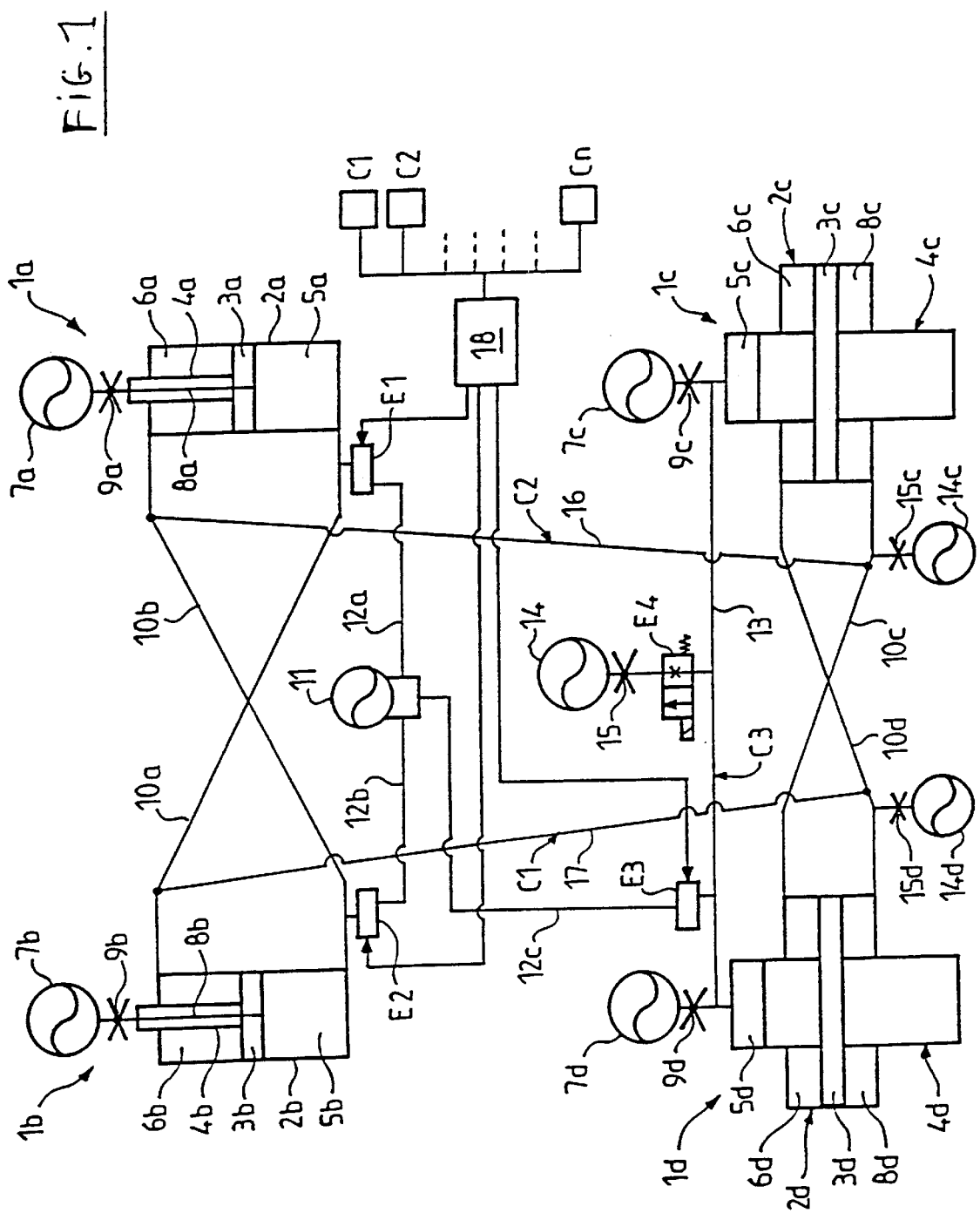
FIG. 1 is a schematic representation of the active hydropneumatic suspension of an automotive vehicle equipped with a control device according to the invention.

FIG. 1 shows that this suspension comprises jacks 1a, 1b, 1c, 1d, which are linked to the front right, front left, rear right, and rear left wheels, respectively.

Each jack 1a, 1b on the front axle is composed of a cylinder 2a, 2b, inside of which a piston 3a, 3b made integral with a rod 4a, 4b delimits a principal chamber 5a, 5b in its lower portion, and an annular chamber 6a, 6b in its upper part. The principal chamber 5a, 5b connects with a main hydropneumatic accumulator 7a, 7b through a duct 8a, 8b provided in the piston and the rod and a shock absorber 9a, 9b. The cylinder 2a, 2b is connected to a wheel support arm (not shown), while the piston 3a, 3b, the rod 4a, 4b, the shock absorber 9a, 9b and the accumulator 7a, 7b are integral with the vehicle body (not shown).

To provide for the anti-tilting function of the front axle, a duct 10a connecting the principal chamber 5a of the front right jack to the annular chamber 6b of the front left jack and a duct 10b connecting the principal chamber 5b of the front left jack to the annular chamber 6a of the front right chamber have been provided.

Two actuators, such as solenoid or servo valves E1 and E2, are connected to the ducts 10a and 10b, respectively, and to a compensating hydropneumatic accumulator 11 by means of the duct 12a and 12b. Furthermore, the actuators E1 and E2 may discharge into a tank or reservoir (not shown).

Each jack 1c, 1d of the rear axle basically comprises a cylinder 2c, 2d, inside which a rod 4a, 4d slides. The shape of the cylinder and of the rod are such that a principal chamber 5c, 5d is delimited in the upper portion of the cylinder, in which the upper part of the rod 4c, 4d forming a piston travels. The principal chamber 5c, 5d connects with a main hydropneumatic accumulator 7c, 7d by means of a shock absorber 9c, 9d.

In addition, the rod 4c, 4d carries a piston 3c, 3d which slides in another portion of the cylinder, where it separates an upper chamber 6c, 6d from a lower chamber 8c, 8d.

The rod 4c, 4d is connected to a wheel-support arm (not shown), while the cylinder 2c, 2d, the shock absorber 9c, 9d, and the accumulator 7c, 7d are integral with the vehicle body.

The main chambers 5c, 5d are connected by a duct 13. A third actuator E3 similar to the first two connects, first, with this duct 13, and second, with the compensating accumulator 11 by means of a duct 12c, and it may also discharge into the aforementioned tank.

In this way, the principal chambers 5c, 5d ensure prevention of oscillation of the rear axle and the height control of the latter by virtue of the actuator E3. Potentially, an additional hydropneumatic accumulator linked to a shock absorber 15 may or may not be connected to the duct 13 through a solenoid valve E4, in order to modify the stiffness and shock-absorption characteristics of the rear axle.

The upper chambers 6c, 6d and lower chambers 8c, 8d provide the anti-tilting function of the rear axle by means of a duct 10c connecting the lower chamber 8c of the right rear jack to the upper chamber 6d of the rear left jack and of a duct 10d connecting the lower chamber 8d of the rear left jack to the upper chamber 6c of the right rear jack. The ducts 10c and 10d connect with hydropneumatic accumulators 14c and 14d, respectively, through the shock absorbers 15c, 15d.

An axle of this type functions conventionally, as is described, for example, in Patents Nos. FR-A-2625711 and FR-A-2581596, and no further description thereof will be provided.

The anti-tilting function is supplemented by a crossing action between the front and rear jacks, which is exerted by means of a duct 16 connecting the ducts 10c and 10b and a duct 17 connecting the ducts 10d and 10a.

In this way, a suspension incorporating three independent lines is created:

The first line C1 comprises the chambers 5a and 6b, the duct 8a, the shock absorber 9a, the accumulator 7a, the ducts 10a, 17, 10d, the chambers 6c and 8d, the shock absorber 15d, and the accumulator 14d.

The second line C2 comprises the chambers 5b and 6a, the duct 8b, the shock absorber 9b, the accumulator 7b, the ducts 10b, 16, 10c, the chambers 8c and 6d, the shock absorber 15c, and the accumulator 14c.

The third line C3 comprises the chambers 5c and 5d, the duct 13, the accumulators 7c and 7d, the shock absorbers 9c and 9d, and potentially, the accumulator 14, the shock absorber 15, and the actuator E4.

It can be seen that the actuators E1, E2, E3 are arranged in such a way as to inject fluid in each of the lines C1, C2, and C3, respectively, or to remove it therefrom.

The actuators E1, E2, E3 are solenoid or servo valves functioning proportionally as regards pressure or, preferably, flow rate, while the solenoid valve E4 is an all-or-nothing valve making it possible to establish or cut off connection with the accumulator 14 and the shock absorber 15.

The actuators E1, E2, E3 are controlled by a computer 18, which is, moreover, connected to a set of sensors $c_1$ to $c_n$, three of which give the height of different points on the body linked to each of the three lines C1, C2, and C3 respectively, and of which the others give different parameters representative of the dynamic state of the vehicle, which are used to determine the components of the aforementioned vectors X', $\gamma$, and $\gamma'$. Accordingly, the computer 18 controls the actuators in a way that will be explained in greater detail below.

In this example, the law of control is simplified so as to carry out an active roll correction and a slow pitch and oscillation correction. In fact, the inventors demonstrated that it was possible to obtain sufficient vehicle stability by performing the active correction of only a single parameter, thereby advantageously simplifying the device.

In the suspension architecture illustrated in the drawing, roll can be controlled using the two front actuators E1 and E2. Pitch and vehicle height may be controlled by controlling oscillation of the rear axle using the actuator E3, which adjusts the height of this rear axle. Finally, oscillation of the front axle can be controlled using the front actuators E1 and E2.

In the example described here, the law of control is reduced to the two following formulae:

$$R = a\psi + b\, d\psi/dt + c\, \gamma_t + d\, \gamma_t/dt \quad (1)$$

$$P = K(p-M)L\, dp/dt \quad (2)$$

where:
  $\psi$ is the angle of roll
  $\gamma_t$ is the transverse acceleration
  p represents oscillation
  R and P are the flow rate corrections of rolling and oscillation, respectively.
  $d\psi/dt$, $d\gamma_t/dt$, and $dp/dt$ are temporal derivatives of $\psi$, $\gamma_t$, and p.
  a, b, c, d, K, M, and L are predetermined constants, M representing the reference position retention of the vehicle.

The expression "flow rate correction of rolling" (or oscillation) designates the single flow rate required in the actuator in question used to correct rolling (or oscillation), which is added to the other flow rates circulating in the actuator. To correct roll, the corresponding flow rates in E1 and E2 are equal and opposite.

As regards angle of roll, the system composed of the body on its suspension acts like a third order seen from the power source constituted by the compensating accumulator 11.

More precisely, a flow rate in the actuators causes a variation of the volume in an elastic element such as the accumulators 1a, 1b, and, accordingly, an increase of the torque reacting against the roll torque generated by the lateral acceleration which the body undergoes. Theoretically, therefore, a flow-rate control that is exactly proportional to the temporal derivative of the roll torque generated on the body suffices to ensure the correction.

One effective estimator of this variable is the temporal derivative of the transverse acceleration $\gamma_t$, which corresponds to the third order time-related derivative of a parameter representing the position of the body.

Transverse acceleration may be measured directly using an accelerometer, or it may be estimated, that is, reconstituted by calculation, from variables representing the dynamic state of the vehicle, for example, the speed and angle of the steering wheel and vehicle speed.

Although this method is less accurate than direct measurement, it has the advantage of anticipating knowledge of acceleration, since, because of tire deformation, a determinate period of time elapses between the instant when the driver begins turning the wheel and the instant when the vehicle begins to undergo actual lateral acceleration.

However, the errors arising from reconstruction may lead to an unsuitable flow rate in the actuators, and thus to inadequate correction. For this reason, consideration must be given to terms of a lower temporal order. Nevertheless, to avoid excessive complexity of the system, consideration may be limited to transverse acceleration, the roll angle and to the angular roll speed, thus giving formula (1), above. As indicated above, transverse acceleration may be measured using an accelerometer or estimated from the angle and speed of the steering wheel and from the vehicle speed. Roll may be calculated from the information supplied by the sensors giving the height of the clearance between the wheel and the body (for example, a sensor for each front wheel and a sensor for the rear axle).

In the example described, the second member of the formula (1) contains four terms, since an active correction of roll is being carried out. The second member of the formula (2) contains only terms expressed by p and dp/dt, since a slow correction of oscillation is being carried out.

When variables such as transverse or longitudinal acceleration are estimated, that is, calculated from variables extrinsic to the body/suspension system, such as the angle and speed of the steering wheel, the results may fail to correspond to reality, since no consideration is accorded to factors such as the height of the center of gravity in relation to the ground, vehicle weight, roll inertia, and, above all, the coefficient of adhesion of the tires. For example, on a road covered with glare ice and in the most unfavorable instance, the vehicle could travel straight ahead despite the fact that the driver turns the wheel. Calculation will give a lateral acceleration, while, in fact, lateral acceleration would be zero.

In accordance with the invention, this problem is corrected simply by modifying the increases represented by the components of the matrices A, B, C, D. Such modification is carried out by assigning to these components coefficients of between 0 and 1.

As indicated above, counter dynamics must be avoided, as must any excess criticality governing control, that is, an excessively marked correction. It will be understood, therefore, that the aforementioned coefficients are dependent on the respective signs of the control variables.

For reasons of simplicity, they may be 0 or 1. In the example of the simplified law of control described here, the truth table appears as follows:

|  |  | Φ, dΦ/dt | | | |
|---|---|---|---|---|---|
|  |  | ++ | +− | −+ | −− |
| γ$_t$, dγ$_t$/dt | ++ | [1 1 1] | [0 1 1] | [0 0 1] | [1 0 0] |
|  | +− | [1 1 0] | [0 1 0] | [0 0 1] | [1 0 1] |
|  | −+ | [1 0 1] | [0 0 1] | [0 1 0] | [1 1 0] |
|  | −− | [1 0 0] | [0 0 1] | [0 1 1] | [1 1 1] | where the numbers between brackets read from left to right are the coefficients modifying the constants b, c, d in formula (1), above.

Figure 2:
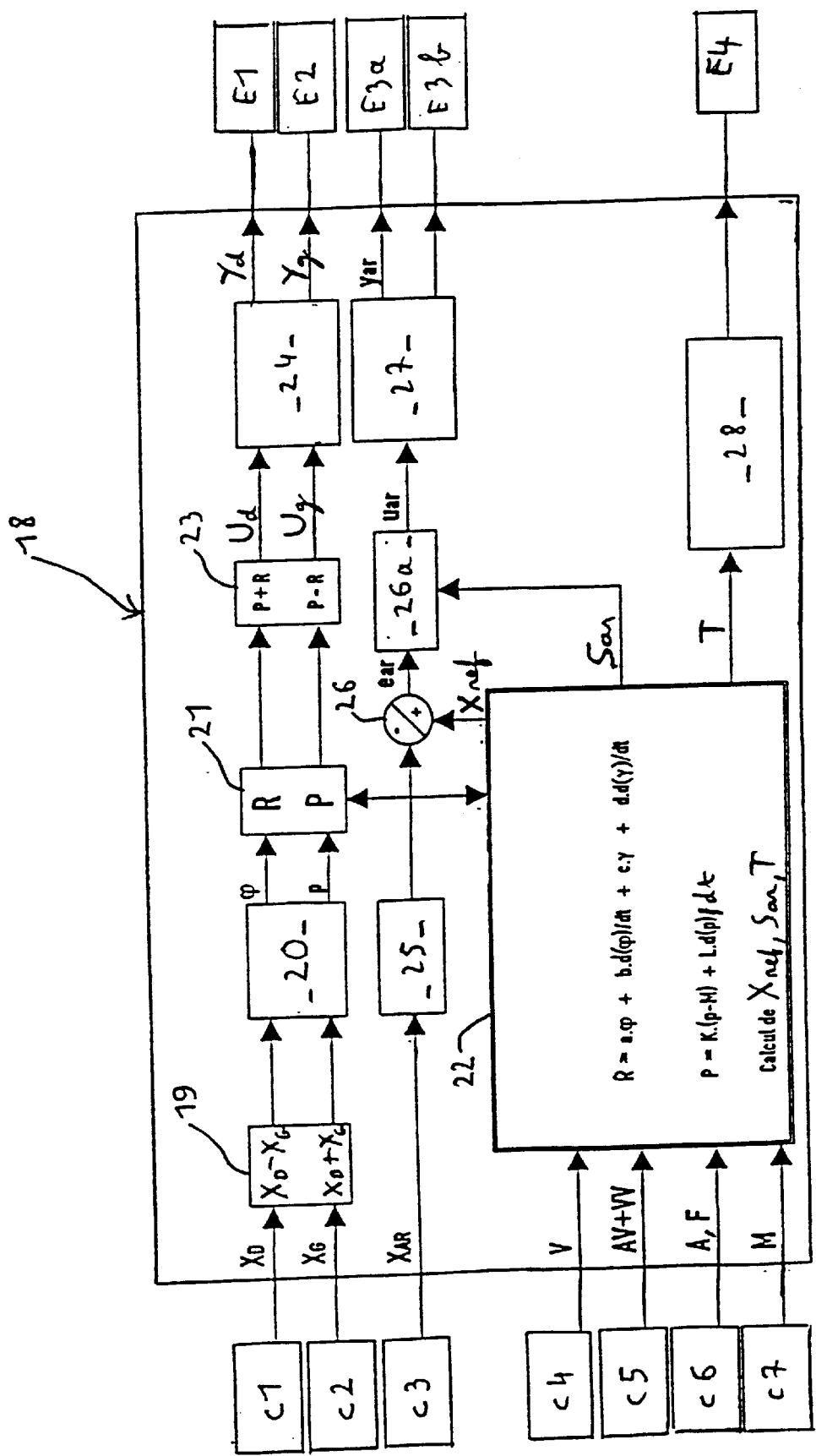
FIG. 2 is a block diagram of the control device belonging to this suspension.

The control device will now be described in greater detail with reference to FIG. 2. This figure shows that the computer 18 is linked to sensors c1 to c7, which give the position of various points of the body and certain parameters representing the dynamic state of the vehicle.

The sensors c1 and c2 supply, respectively, the right front height Xd and the left front height XG, while c3 supplies the height XAR of the rear axle. The word "height" as used here signifies the height of a point associated with the body in relation to a point associated with the wheel. The signals XD and XG are first transmitted to a first unit 19, which calculates the difference XD−XG representing roll ψ, and the sum XD+XG, which represents the oscillation p of the front axle. After filtering through a low-frequency filter 20, the corresponding signals are transmitted to a unit 21 which calculates the flow-rate corrections R and P in accordance with the formulae (1) and (2), above, and with the truth table described above. The filter 20 is used primarily to eliminate interference caused by unevenness of the road.

The unit 21 is linked to a sub-unit 22 (which may be incorporated into the unit 21), which, first, calculates the constants a, b, c, d, K, M, L in these formulae, and second, calculates the temporal derivatives dψ/dt and dp/dt of ψ and p, respectively, as well as transverse acceleration γ and the temporal derivative dγ/dt of this acceleration. These calculations are performed based on the signals supplied by the sensors c4, c5, and c6, which supply the speed V of the vehicle (c4), the angle AV and speed VV of the steering wheel (c5) and of the quantities (A, F) representing acceleration and braking (c6). The terms dψ/dt and dp/dt are obtained by differentiation. Acceleration γ is calculated based on the angle of the steering wheel and the speed of the vehicle, while dγ/dt is calculated based on the speed of the steering wheel and the speed of the vehicle. These last calculations will not be explained further here, since they are conventionally known and described, for example, in Patent no. FR-A-2680139.

The signals R and P are then transmitted to a unit 23, which calculates P+R and P−R, which represent the corrections to be implemented by the actuators E1 and E2 in the corresponding lines C1 and C2, respectively. In fact, the oscillation correction is identical for both wheels of a single axle, while the roll corrections are equal and opposite. The corresponding signals Ud and Ug are transmitted to the unit 24 controlling the front solenoid valves (which, in the present instance, are proportional solenoid valves), this unit transforming these digital signals into control signals Yd and Yg, which correspond to flow rates and are fed to the solenoid valves E1 and E2, respectively, the signals Yd and Yg being electric power signals.

This device also ensures slow correction of the height of the rear axle. To this end, the signal XAR supplied by the sensor c3 first travels through a low-frequency filter 25 in order to correct only the significant variations of height. The signal thus filtered is transmitted to a unit 26 which calculates the correction to be applied e$_{ar}$, by calculating the difference between the reference height Xref and the height as measured XAR. The reference height depends on the position of the manual height-selection lever which equips most vehicles having hydropneumatic suspensions, and, potentially, on the speed V of the vehicle supplied by the sensor c4. This reference height is calculated and transmitted to the unit 26 by the sub-unit 22 based on the information emanating from the sensor c7 regarding the position of this lever and, potentially, of the sensor c4. The value of the correction ear is then compared, in a comparator 26a, to a preliminarily-calculated threshold S$_{ar}$ also supplied by the sub-unit 22, below which the correction is not made. The corresponding signal U$_{ar}$ is then transmitted to the unit 27 controlling the rear actuator E3. The latter may be a proportional solenoid valve, or it may consist of two all-or-nothing solenoid valves, that is, an admission solenoid valve E3a and an escape solenoid valve E3b. In this case, the signal Y$_{ar}$ is transmitted by the unit 27 to either of the solenoid valves E3a and E3b, depending on whether fluid must be fed into the line C3 or removed therefrom.

Finally, when the rear axle is equipped with an additional hydropneumatic accumulator 14 such as that illustrated in FIG. 1 in order to vary the stiffness and shock-absorption characteristics thereof, the computer 18 is equipped with stiffness-adjustment control 28, which controls the solenoid valve E4 as a function of the signal T transmitted by the sub-unit 22, this signal being a function of the parameters supplied by the sensors c4 to c6, in accordance with a predetermined law.

Accordingly, a device for active control of the suspension of an automotive vehicle has been produced, this device providing for excellent stability of this vehicle, since the correction takes into account not only the position of the body, but also the time-related first, second, and third order derivatives of this position, thereby making possible continuous adaptation. Furthermore, depending on the suspension architecture used, the law may be simplified, thus reducing the complexity and cost of the device. As regards errors caused by a poor estimation of certain variables, the effects of such errors are removed very simply by modifying increases using a truth table.

The invention is obviously not limited to the sole embodiment described and illustrated, but encompasses all variants thereof. It may, therefore, cover an active anti-pitch control. The latter is applicable to a suspension architecture in which the wheel jacks located on the same side of the front and rear axles are crisscrossed in order to combat pitch. In this case, consideration must be given to longitudinal acceleration, which can be measured or estimated based on parameters such as vehicle speed, the pressure exerted on the brake pedal, and the accelerator position. Finally, while the description has been provided with reference to a hydropneumatic suspension, the invention is also applicable to a pneumatic suspension.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A device for controlling a suspension such as a hydropneumatic suspension of an automotive vehicle comprising multiple independent lines (C1, C2, C3), each of which is associated with an actuator (E1, E2, E3) capable of feeding fluid into this line or of removing it therefrom in accordance with a predetermined control law based on the position of the body and of variations occurring over time in the body position, said law taking into account at least one of the following variables: speed of spring motion of the body, acceleration of the spring motion of said body, and temporal derivative of this acceleration, wherein said law is represented by the formula:

$$q = A(X-Xo) + BX' + C\gamma + d\gamma' \quad$$

where:

q is the control vector of the actuators

X is the body-position vector

Xo is the vector representing the reference position of the body

X' is the body spring motion speed vector $\gamma$ is the body spring motion-acceleration vector $\gamma'$ is the vector representing the temporal derivative of this acceleration, and A, B, C, D are matrices whose terms are predetermined constants, and wherein each wheel of said vehicle has a suspension comprising a cylinder in which slides a piston integral with a rod so as to delimit at least one fluid chamber, one of said cylinder and said rod being integral with said each wheel, and the other of said cylinder and said rod being integral with a chassis of said vehicle, and one of said lines C1, C2, C3 communicating with said fluid chamber.

2. The device according to claim 1, wherein the actuators are controlled as regards pressure or, preferably, flow rate.

3. The device according to claim 1, wherein the terms of the matrices A, B, C, D are modified by a truth table in order to take into account uncertainties regarding the control variables.

4. The device according to claim 1, wherein body position is determined by means of three parameters representing three degrees of freedom of said body.

5. The device according to claim 4, wherein the three degrees of freedom are roll, pitch, and oscillation.

6. The device according to claim 4, wherein, for each degree of freedom, the truth table is determined so as to prohibit counter dynamics.

7. The device according to claim 1, wherein the control variables are either measured, calculated, or estimated.

8. The device according to claim 7, wherein the position and speed of spring motion of the body are measured or calculated, acceleration of spring motion of the body is measured or estimated, and the temporal derivative of this acceleration is calculated or estimated.

9. The device according to claim 8, wherein acceleration of the spring motion of the body is estimated based on at least one of the following parameters: angle and speed of the steering wheel, vehicle speed, pressure in the brake circuit, position of the acceleration pedal or of the throttle.

10. The device according to claim 1, wherein said law is in simplified form in order to make an active correction in at least one of said degrees of freedom and a slow correction in one or the other degree(s) of freedom.

11. The device according to claim 10, wherein said law is adjusted so as to make an active correction of roll and a slow correction of pitch and oscillation.

12. The device according to claim 11, wherein said law is represented by the following formulae:

$$R = a\psi + b\, d\psi/dt + c\, \gamma_t + d\, \gamma_t/dt \quad (1)$$

$$P = K(p-M)L\, dp/dt \quad (2)$$

where:

$\psi$ is the angle of roll $\gamma_t$ is the transverse acceleration p represents oscillation R and P are the flow rate corrections of rolling and oscillation, respectively $d\psi/dt$, $d\gamma_t/dt$, and $dp/dt$ are temporal derivatives of $\psi$, $\gamma_t$, and p a, b, c, d, K, M, and L are predetermined constants, M representing the reference position retention of the vehicle.

13. The device according to claim 12, wherein the terms of the matrices A, B, C, D are modified by a truth table represented by the following table:

|  |  | $\Phi$, $d\Phi/dt$ | | | |
|---|---|---|---|---|---|
|  |  | ++ | +− | −+ | −− |
| $\gamma_v d\lambda_t/dt$ | ++ | [1 1 1] | [0 1 1] | [0 0 1] | [1 0 0] |
|  | +− | [1 1 0] | [0 1 0] | [0 0 1] | [1 0 1] |
|  | −+ | [1 0 1] | [0 0 1] | [0 1 0] | [1 1 0] |
|  | −− | [1 0 0] | [0 0 1] | [0 1 1] | [1 1 1] | where the numbers between brackets read from left to right are coefficients modifying the constants b, c, d in formula (1) above, respectively.

14. The device according to claim 1, wherein the actuators (E1, E2, E3) are pressure-proportional, or preferably flow rate-proportional, solenoid or servo valves.

15. The device according to claim 1, wherein said device comprises position sensors ($c_1$ to $c_n$) which give the position of various points on the body and are connected to a computer (18) capable of calculating, first, the parameters representing body position, and second, the flow rate or pressure required in each actuator as a function of these parameters and of the other control variables.

* * * * *